United States Patent [19]

Zhu et al.

[11] Patent Number: 6,010,564
[45] Date of Patent: *Jan. 4, 2000

[54] JET INK COMPOSITION

[75] Inventors: Linfang Zhu, Naperville; Mark A. Chamerlik, Elk Grove Village; Mohammed W. Siddiqui, Carol Stream; Jose F. Ezpeleta, Glendale Heights, all of Ill.

[73] Assignee: Videojet Systems International, Inc., Wood Dale, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/951,898

[22] Filed: Oct. 16, 1997

[51] Int. Cl.$^7$ .......................... C09D 11/14; C09D 11/08; B41J 2/01
[52] U.S. Cl. ........................................ 106/31.37; 347/100
[58] Field of Search ............................ 106/31.37, 169.18, 106/169.19, 169.23, 169.24; 347/100

[56] References Cited

U.S. PATENT DOCUMENTS

| | | | |
|---|---|---|---|
| 1,833,086 | 11/1931 | Middleton | 106/31.37 |
| 2,460,925 | 2/1949 | Decker | 106/31.37 |
| 3,060,429 | 10/1962 | Winston . | |
| 3,298,030 | 1/1967 | Lewis et al. . | |
| 3,373,437 | 3/1968 | Sweet et al. . | |
| 3,416,153 | 12/1968 | Hertz et al. . | |
| 3,673,601 | 6/1972 | Hertz . | |
| 3,912,675 | 10/1975 | Hoshi et al. . | |
| 4,207,577 | 6/1980 | Mansukhani . | |
| 4,389,503 | 6/1983 | Maxwell et al. | 106/31.37 |
| 4,507,342 | 3/1985 | Kielbania, Jr. . | |
| 4,567,213 | 1/1986 | Bhatia et al. . | |
| 4,680,058 | 7/1987 | Shimizu et al. . | |
| 5,122,187 | 6/1992 | Schwarz et al. . | |
| 5,160,536 | 11/1992 | Harris et al. | 106/31.37 |
| 5,254,158 | 10/1993 | Breton et al. . | |
| 5,397,387 | 3/1995 | Deng et al. | 106/31.37 |
| 5,594,044 | 1/1997 | Yang | 106/31.37 |
| 5,637,139 | 6/1997 | Morelos et al. | 106/31.37 |
| 5,658,968 | 8/1997 | Catena et al. | 523/161 |
| 5,663,217 | 9/1997 | Kruse | 106/31.37 |
| 5,708,110 | 1/1998 | Bennett et al. . | |

FOREIGN PATENT DOCUMENTS

| | | |
|---|---|---|
| 2385782 | 10/1978 | France . |
| 87006567 | of 1987 | Japan . |
| 16606 | of 1989 | Japan . |
| 1245071 | 9/1989 | Japan . |
| 4372640 | of 1993 | Japan . |
| 8165447 | 6/1996 | Japan . |
| 1603062 | 11/1981 | United Kingdom . |
| 2105735 | 3/1983 | United Kingdom . |

OTHER PUBLICATIONS

Miller et al., Journal Abstract No. WSCA 87–08917 of Pinturas Acabados, No. 155, p. 60–4, (1987) no month avail (Spanish).

Lawniczak et al., Conference Abstract No. WSCA 95–669 of ACS, Div. of PMSE, Papers (1993) no month avail vol. 68, 28–9.

Khanna et al., Journal Abstract No. WSCA 76–00897 of Paintindia, vol. 25, No. 7, 22–3 (1975) no month avail.

Kuhn et al., *Scientific American*, (Apr., 1979), 162–178.

Keeling, *Phys. Technol.*, 12(5), 196–303 (1981) no month avail.

*Primary Examiner*—David Brunsman
*Attorney, Agent, or Firm*—Leydig, Voit & Mayer, Ltd.

[57] ABSTRACT

The present invention provides a jet ink composition suitable for printing on substrates such as plastics messages having abrasion resistance, the composition comprising an organic solvent, a colorant, a cellulose nitrate resin, and a rosin resin. For example, the messages printed on untreated low density polyethylene and polypropylene substrates have improved rub resistance and scratch resistance. The present invention further provides a method for printing abrasion resistant messages on a surface comprising projecting a stream of droplets of the jet ink composition to the surface, controlling the direction of the stream so that the droplets are caused to form the desired printed messages, and allowing the messages to dry.

20 Claims, No Drawings

JET INK COMPOSITION

TECHNICAL FIELD OF THE INVENTION

The present invention relates to a jet ink composition and a method for jet printing messages on substrates such as plastics which have resistance to abrasion.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed image on that surface. This technique of noncontact printing is particularly well suited for application of characters onto substrates such as glass, metal, or plastic containers and packages.

Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Pat. Nos. 3,060,429, 3,298,030, 3,373,437, 3,416,153, and 3,673,601.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, resist abrasion, and be capable of passing through the ink jet nozzle without clogging, and permit rapid cleanup of the machine components with minimum effort.

Plastic substrates, particularly low surface energy plastics substrates such as polyolefins, present certain problems with respect to the quality and robustness of the printed message. The messages can be rubbed off or scratched off during normal handling with relatively moderate force if the adhesion of the message to the substrate is poor. In order to alleviate this problem, plastic surfaces are sometimes provided with a surface treatment such as oxidation, carona treatment or plasma treatment, or a coating of a primer. The above pretreatments add to the cost of the package manufacturing process. Thus, there is a need for a jet ink composition that avoids or minimizes the need for a pretreatment of a plastic substrate, particularly a polyolefin substrate.

Although ink jet ink compositions are known, ink jet ink compositions that are suitable for printing abrasion resistant messages on untreated, low energy plastic surfaces have been rare. The need for abrasion resistant ink jet ink compositions is clear from the patent and technical literature. For example, U.S. Pat. No. 5,594,044 discloses a jet ink composition suitable for printing messages having good adhesion and isopropyl alcohol rub resistance comprising an organic solvent, a flexible thermoplastic urethane resin, a colorant, a cellulose nitrate resin, and an adhesion promoter such as a titanate.

U.S. Pat. No. 4,207,577 relates to an ink jet ink composition that includes a cellulosic derivative, a resin component, and at least one solvent. Although the the patent states that the ink has adhesion to "practically all substrates", it appears that the patent is concerned with providing a jet ink for printing on virgin metal or coated substrates. See, e.g., column 3, lines 60–63: "depending upon [the] type of substrate on which ink is to be printed, it is advantageous to use a solvent which will penetrate the wax or other coating on substrates to enhance adhesion and rub resistance."

The foregoing indicates that there is a need for a jet ink composition that is suitable for printing on plastic surfaces, particularly low energy surfaces such as polyolefin surfaces, messages that have abrasion resistance in general, and in particular, messages that have rub resistance and fingernail scratch resistance.

SUMMARY OF THE INVENTION

The foregoing needs have been fulfilled to a great extent by the present invention which provides a jet ink composition suitable for printing on substrates such as plastics messages having abrasion resistance. The jet ink composition comprises an organic solvent, a colorant, a cellulose nitrate resin, and a rosin resin.

The present invention further provides a method for printing abrasion resistant messages on a surface comprising projecting a stream of droplets of the jet ink composition to the surface, controlling the direction of the stream so that the droplets are caused to form the desired printed messages, and allowing the messages to dry.

The foregoing and other objects and advantages of the present invention, as well as additional inventive features, will be apparent from the description of the preferred embodiments of the invention provided herein.

DETAILED DESCRIPTION OF THE PREFERRED EMBODIMENTS

The present invention provides a jet ink composition suitable for printing on substrates such as plastics messages having abrasion resistance, the composition comprising an organic solvent, a colorant, a cellulose nitrate resin, and a rosin resin. The ink composition may further include ingredients such as blush-resistant agents, plasticizers, wetting agents, and conductivity agents.

The present invention is predicated on the discovery that a jet ink composition having a combination of a cellulosic resin, particularly a cellulose nitrate resin, and a rosin resin has unique and unexpected properties. The messages printed on substrates, particularly low energy substrates such as polyolefins, have excellent adhesion to the substrates. The messages show improved rub resistance and scratch resistance. A further advantage of the ink composition of the present invention is that abrasion resistant messages can be printed on low energy surfaces even without the use of an adhesion promoter.

In general, the ink compositions of the present invention exhibit the following characteristics for use in ink jet printing systems: (1) a viscosity from about 1.6 to about 10 centipoises (cps) at 25° C.; (2) an electrical resistivity from about 50 to about 2000 ohm-cm; and (3) a sonic velocity from about 1100 to about 1700 meters/second.

A detailed description of the various components of the ink composition is set forth herein below.

ORGANIC SOLVENT

The jet ink composition of the present invention includes at least one organic solvent, and preferably a mixture of two organic solvents. Any suitable organic solvent can be used provided that the solvent has sufficient solubility for the resins, and volatility so that the ink drying time is not excessive. The type and amount of solvents chosen would also affect the viscosity of the jet ink composition.

Organic solvents suitable for the ink composition of the present invention include ketones such as acetone, methyl ethyl ketone, diethyl ketone, cyclohexanone, and the like, esters such ethyl acetate, propyl acetate, butyl acetate, and the like, alcohols such methanol, ethanol, n-propanol, isopropanol, n-butanol, i-butanol, t-butanol, n-pentanol, n-hexanol, and the like. Alcohols and ketones are preferred solvents. Although water can also be present in small amounts in a solvent mixture, it is preferable to keep the water content low, e.g., below about 5% by weight of the solvent mixture.

The organic solvent can be present in any suitable amount, for example, in an amount of up to about 90% by weight of the jet ink composition, and preferably in an amount of from about 30% by weight to about 80% by weight of the jet ink composition. If a mixture of solvents such as acetone and ethanol is used as the organic solvent, it is preferred that the proportion of acetone is greater than that of ethanol. For example, acetone can be present in an amount of from about 40% by weight to about 60% by weight of the jet ink composition, and ethanol can be present in an amount of from about 10% by weight to about 30% by weight of the jet ink composition.

COLORANT

The ink composition comprises a colorant which is a pigment or dye that imparts the desired color to the printed message. Any dye that may be dissolved in the ink composition may be used in the instant invention. For instance, U.S. Pat. No. 5,254,158 and UK Patent Application GB 2105735 list several examples of dyes, the disclosures of which are incorporated herein by reference.

Examples of suitable dyes include, but are not limited to, direct dyes, acid dyes, base dyes, and various solvent soluble dyes. Examples of such dyes include yellow dyes such as C.I. Solvent Yellow 19 (C.I. 13900A), C.I. Solvent Yellow 21 (C.I. 18690), C.I. Solvent Yellow 61, C.I. Solvent Yellow 80, FD&C Yellow #5, Yellow Shade 16948, Acid Yellow 23, Levaderm Lemon Yellow (Mobay), Spirit Fast Yellow 3G, Aizen Spilon Yellow C-GNH (Hodagaya Chemical Co.), Pergasol Yellow CGP (Ciba-Geigy), and the like, orange dyes such as C.I. Solvent Orange 1 (C.I. 11920), C.I. Orange 37, C.I. Orange 40, Diaresin Orange K (Mitsubishi Chemical Industries, Ltd.), Diaresin Orange G (Mitsubishi Chemical Industries, Ltd.), Sumiplast Orange 3G (Sumitomo Chemical Co., Ltd.), and the like, red dyes such as C.I. Solvent Red 8, C.I. Solvent Red 81, C.I. Solvent Red 82, C.I. Solvent Red 84, C.I. Solvent Red 100, Cibacron Brilliant Red 38-A (Aldrich Chemical Co.), Drimarene Brilliant Red E-6A (Pylam, Inc.), Acid Red 92, Reactive red 31 (ICI America), and the like, pink dyes such as Diaresin Pink M (Mitsubishi Chemical Industries, Ltd.), Sumiplast Pink RFF (Sumitomo Chemical Co.), Direct Brill Pink B Ground Crude (Crompton & Knowles), and the like, violet dyes such as C.I. Solvent Violet 8, C.I. Solvent Violet 21, Diaresin Violet (Mitsubishi), Diaresin Violet D, Sumiplast Violet RR (Sumitomo), and the like, blue dyes such as C.I. Solvent Blue 2, C.I. Solvent Blue 11, C.I. Solvent Blue 25, C.I. Solvent Blue 36, C.I. Solvent Blue 55, and the like, green dyes such as C.I. Solvent Green 3 and the like, brown dyes such as C.I. Solvent Brown 3 and Diaresin Brown A (Mitsubishi), and the like, black dyes such as C.I. Solvent Black 3, C.I. Solvent Black 5, C.I. Solvent Black 7, C.I. Solvent Black 22, C.I. Solvent Black 27, C.I. Solvent Black 29, Acid Black 123, and the like. Solvent Black 29, a preferred dye, is commercially available as Valifast Black 3810 (Orient Chemical) or Orasol Black RLI (Ciba).

The colorant is present in the ink composition in an amount required to produce the desired contrast and readability. The colorant is preferably present in an amount of from about 1% to about 10% by weight of the jet ink composition and more preferably in the range of about 2% to about 6% by weight of the jet ink composition.

CELLULOSIC RESIN

The jet ink composition comprises a cellulosic resin. Any suitable cellulosic resin can be used. Examples of cellulosic resins include cellulose esters and cellulose ethers. A preferred cellulosic resin is cellulose nitrate.

Cellulose nitrate is the reaction product of cellulose with nitric acid. Various grades of cellulose nitrate are characterized by the degree of substitution by nitro groups of the hydroxyl groups of cellulose. Cellulose nitrates which are useful in the present invention include any of a wide variety of cellulose nitrates including those which are commercially available. Useful cellulose nitrates include the RS, AS, and SS type cellulose nitrates wetted by isopropyl alcohol, ethanol or water, sold by Hercules, Inc. in Wilmington, Del. The RS type cellulose nitrate has a nominal degree of substitution which corresponds to a nitrogen content of about 12% by weight of the resin. A solution of the RS type cellulose nitrate, SCHOLLE™ 5390, is available from Scholle Corp. in College Park, Ga. SCHOLLE 5390 is a 35% by weight solution of the RS type 20 cps cellulose nitrate resin in isopropanol (15% by weight of the solution) and acetone (50% by weight of the solution).

The cellulosic resin may be present in the jet ink composition in any suitable amount, for example, in an amount of up to about 20% by weight of the ink composition, preferably in an amount of from about 5% by weight to about 10% by weight of the ink composition, and more preferably in an amount of from about 6% by weight to about 8% by weight of the ink composition.

ROSIN RESIN

The jet ink composition of the present invention comprises a rosin resin. Any suitable rosin resin known to those skilled in the art can be used. The rosin resin can be a natural resin or a modified resin. Modified rosin resins include, for example, stabilized rosin resins, polymerized rosin resins, and esterified rosin resins. Esterification can be carried out using known monovalent alcohols such as alcohols such as methanol, ethanol, propanol and the like, and polyvalent alcohols such as ethylene glycol, propylene glycol glycerol, pentaerythritol, and the like. The rosin resin can also be modified by addition reactions such as by addition of a maleic anhydride or by hydrogenation or dehydrogenation to render the rosin resin more stable, e.g., to oxidation.

Rosin resins are available commercially. Rosin esters sold by Arakawa Chemical (USA) Inc. in Chicago, Ill. under the tradenames SUPER ESTER™, HYPALE™, ESTER GUM™, and PENSEL™ can be used. Rosin resins sold by Hercules, Inc. under the tradenames CELLOLYN™, PENTALYN™, STAYBELITE™, POLY-PALE™, and PENTREX™ can also be used. Rosin resins sold by Union Camp Corp. under the tradenames UNI-REZ™ and UNI-TAC™ can also be used. SYLVATAC™ resins from Arizona Chemical in Panama City, Fla. and ESCOREZ™ from EXXON Corp. can also be employed.

An example of a preferred rosin resin is the highly stabilized gum rosin ester, SUPER ESTER A-75, having a softening point of 75° C. Another example of a preferred rosin resin is SYLVATAC RX which is a stabilized tall oil rosin having a softening point of 74° C. and available from Arizona Chemical Co. Yet another example of a preferred rosin resin is SYLVATAC 295, which is a selectively polymerized rosin resin. PENTREX 28, another preferred rosin resin, is a maleic modified glycerol ester of rosin having softening point of 129° C. PENTALYN 830, another preferred rosin resin, is a modified rosin resin based largely on a pentaerythritol ester of a modified rosin. PENTALYN 830 has a softening point of 118° C.

The rosin resin can be present in the jet ink composition in any suitable amount, for example, in an amount of up to about 30% by weight of the ink composition, and preferably in an amount of from about 1% by weight to about 5% by weight of the ink composition.

PLASTICIZER

The jet ink composition may preferably contain a plasticizer. It is beleived that the plasticizer improves the flexibility of the film that forms when the ink dries on the substrate. The improved flexibility contributes to a certain extent to an improvement in abrasion resistance. Any suitable plasticizer known in the industry can be used. See, e.g., U.S. Pat. No. 5,594,044 which discloses at column 6, line 36, to column 7, line 6, plasticizers suitable for use in ink jet compositions, the disclosure of which is incorporated herein by reference. A preferred plasticizer for use in the ink composition of the present invention is Plasticizer 160 which is butyl benzyl o-phthalate and available from Monsanto Co.

The plasticizer can be present in any suitable amount. For example, the plasticizer can be present in the jet ink composition in an amount of up to about 5% by weight of the ink composition, preferably in an amount of from about 1% by weight to about 5% by weight, and more preferably in an amount of about 3% by weight of the ink composition.

BLUSH-RESISTANT AGENT

The jet ink composition of the present invention may include an agent to impart blush resistance to the printed message. Under hot and/or humid conditions of ink jet printing, the freshly printed messages tend to absorb moisture from the atmosphere, which results in a poor quality printed message. This is known as blushing. The absorption of moisture is caused by the rapid cooling of the message as the solvents evaporate rapidly during the drying of the messages. To eliminate blushing, one or more blush-resistant agents may be included in the ink composition. A blush-resistant agent is particularly desirable when a rapidly drying solvent such as acetone is used as the ketone solvent.

Any blush-resistant agent known to those skilled in the art, for example, certain high boiling solvents, can be used. For example, high boiling solvents having a relative evaporation rate of less than about 1.0, preferably those having a relative evaporation rate of from about 0.1 to about 1.0, and more preferably those having a relative evaporation rate of from about 0.3 to about 0.5, can be employed. In this repect, butyl acetate has a relative evaporation rate of 1.0. Esters and ketones are preferred blush-resistant agents. Preferred examples of blush-resistant agents include primary amyl acetate and isobutyl isobutyrate.

The blush-resistant agent can be used in any suitable amount. For example, the blush-resistant can be present in the jet ink composition in an amount of up to about 10% by weight of the ink composition, preferably in an amount of from about 1% by weight to about 5% by weight, and more preferably in an amount of about 3% by weight of the ink composition.

WETTING AGENT

The jet ink composition may further include a wetting agent. It is known in the art that droplet size of the ink on the substrate can be controlled by the use of a wetting agent. Any suitable wetting agent known to those of ordinary skill in the art may be used. An example of a wetting agent is a surfactant. The surfactant may be anionic, cationic, nonionic, or amphoteric. SILWET™ L-7622, available from Witco Corp., OSI Specialties Group, Tarrytown, N.Y., is a silicone based wetting agent and is an example of a preferred wetting agent. For additional wetting agents, see, e.g., U.S. Pat. No. 5,594,044 which discloses various surfactants at column 5, lines 43–64, the disclosure of which is incorporated herein by reference.

The wetting agent may be present in the jet ink composition in an amount of up to about 1% by weight, preferably in an amount of about 0.1% to about 1% by weight of the jet ink composition.

OTHER ADDITIVES

The jet ink composition may contain additives for adjusting the viscosity, electrical resistivity, and the speed of evaporation. The preferred range of viscosity is about 1.6 cps to about 6.0 cps. The preferred resistivity is about 500 ohm-cm to about 1500 ohm-cm.

The compositions of the present invention may contain conductivity agents. If present, they usually are present in amount of up to about 2.0 percent. Examples of suitable conductivity agents include dimethylamine hydrochloride, diethylamine hydrochloride, lithium nitrate, and hydroxylamine hydrochloride. Sufficient conductivity may be offered by the soluble dyes in the presence of the solvent used in the ink and a conductivity agent may not be necessary. If a pigment is used, then a conductivity agent may be needed.

The present invention further provides a jet ink composition as described above wherein acetone is present in an amount of from about 30% by weight to about 70% by weight of the jet ink composition, ethanol is present in an amount of from about 5% by weight to about 40% by weight of the jet ink composition, a dye is present in an amount of from about 2% by weight to about 6% by weight of the jet ink composition, a cellulose nitrate resin is present in an amount of from about 5% by weight to about 10% by weight of the jet ink composition, a rosin resin is present in an amount of from about 1% by weight to about 5% by weight of the jet ink composition, a plasticizer is present in an amount of from about 1% by weight to about 3% by weight of the jet ink composition, and a blush-resistant is present in an amount of from about 1% by weight to about 5% by weight of the jet ink composition.

The present invention further provides a method for printing abrasion resistant messages on a surface comprising projecting a stream of droplets of the jet ink composition to the surface, controlling the direction of the stream so that the droplets are caused to form the desired printed messages and allowing the messages to dry. In a continuous ink jet printing process the direction of the stream is controlled electronically.

The following examples further illustrate the present invention but, of course, should not be construed as in any way limiting its scope.

EXAMPLE 1

This Example illustrates the preparation of an embodiment of the ink composition of the present invention, wherein a modified rosin ester, SUPER ESTER A-75, was employed. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of isopropanol and 50% of acetone) | 18.0 |
| SUPER ESTER A-75 (Arakawa) | 3.0 |

-continued

| Ingredients | wt % |
| --- | --- |
| Plasticizer 160 (Monsanto) | 1.5 |
| Primary amyl acetate (Union Carbide) | 3.0 |
| ORASOL BLACK RLI (Ciba) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance.

Rub resistance was tested by rubbing 10 times the dry printed message with a thumb using a heavy force. Scratch resistance was tested by scratching the dry printed message 10 times with a fingernail using a medium force. The rub or scratch resistance was rated 'good' if the message was not at all or only very slightly removed, 'fair' if the message was partially removed and still legible, and 'poor' if the message was completely removed and illegible.

The messages printed on glass aluminum, tin, PETG, polystyrene, and polycarbonate substrates had 'good' rub resistance and scratch resistance. The messages printed on low density polyethylene (LDPE) substrates also had 'good' rub resistance and 'good' scratch resistance. The messages printed on polypropylene (PP) substrates had 'good' rub resistance and 'fair' scratch resistance. The results of the tests, as well as those of Examples 2–10 set forth in the form of a summary in Table 1 which follows Example 10.

EXAMPLE 2

This Example illustrates the preparation of another embodiment of the ink composition of the present invention. In this embodiment, a stabilized tall oil rosin resin, SILVATAC RX, was employed. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| SYLVATAC RX (Arizona Chemical) | 3.0 |
| Plasticizer 160 (Monsanto) | 1.5 |
| Primary amyl acetate (Union Carbide) | 3.0 |
| ORASOL BLACK RLI (Ciba) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on LDPE substrates also had 'good' rub resistance and 'good' scratch resistance. The messages printed on PP substrates had 'good' rub resistance and 'fair' scratch resistance.

EXAMPLE 3

This Example illustrates the preparation of another embodiment of the ink composition of the present invention. In this embodiment, a selectively polymerized rosin resin, SILVATAC 295, was employed. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 28.0 |
| Nitrocellulose; RS type, 15 cps, wetted with 30% IPA (Hercules) | 10.0 |
| SYLVATAC 295 (Arizona Chemical) | 3.0 |
| Plasticizer 160 (Monsanto) | 1.5 |
| Isobutyl Isobutyrate (Aldrich Chemical) | 3.0 |
| VALIFAST BLACK 3810 (Orient Chemical) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 4

This Example illustrates the preparation of another embodiment of the ink composition of the present invention. In this embodiment, a modified rosin resin which is largely a pentaerythritol ester, PENTALYN 830, was employed. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| PENTALYN 830 (Hercules) | 3.0 |
| Plasticizer 160 (Monsanto) | 1.5 |
| Primary amyl acetate (Union Carbide) | 3.0 |
| VALIFAST BLACK 3810 (Orient Chemical) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 5

This Example illustrates the preparation of another embodiment of the ink composition of the present invention. This embodiment is substantially the same as the one illustrated in Example 1, except that the dye was obtained from a different source. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| SUPER ESTER A-75 (Arakawa) | 3.0 |
| Plasticizer 160 (Monsanto) | 1.5 |
| Primary amyl acetate (Union Carbide) | 3.0 |
| VALIFAST BLACK 3810 (Orient Chemical) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 6

This Example illustrates the preparation of another embodiment of the ink composition of the present invention. This embodiment is substantially the same as the one illustrated in Example 2, except that the dye was obtained from a different source. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| SYLVATAC RX (Arizona Chemical) | 3.0 |
| Plasticizer 160 (Monsanto) | 1.5 |
| Primary amyl acetate (Union Carbide) | 3.0 |
| VALIFAST 3810 (Orient) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 7

This Example illustrates the preparation of another embodiment of the ink composition of the present invention. This embodiment is substantially the same as the one illustrated in Example 3, except that a different blush-resistant was employed. The following ingredients were used.

| Ingredients | wt % |
| --- | --- |
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| SYLVATAC 295 (Arizona Chemical) | 3.0 |
| Plasticizer 160 (Monsanto) | 1.5 |
| Primary amyl acetate (Union Carbide) | 3.0 |
| VALIFAST BLACK 3810 (Orient Chemical) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 8

This Example illustrates the preparation of another embodiment of the ink composition of the present invention. No wetting agent was employed in this composition. The following ingredients were used.

| Ingredients | wt % |
| --- | --- |
| Acetone, 99% (Ashland) | 50.5 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| PENTREX 28 (Hercules) | 3.0 |
| Plasticizer 160 (Monsanto) | 1.5 |
| Primary amyl acetate (Union Carbide) | 3.0 |
| VALIPAST 3810 (Orient) | 4.0 |
| | 100.0 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 9

This Example illustrates the preparation of another embodiment of the ink composition of the present invention. This embodiment is substantially the same as the one illustrated in Example 8, except that the composition includes a wetting agent. The following ingredients were used.

| Ingredients | Parts By Weight |
|---|---|
| Acetone, 99% (Ashland) | 50.5 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| PENTREX 28 (Hercules) | 3.0 |
| Plasticizer 160 (Monsanto) | 1.5 |
| Primary amyl acetate (Union Carbide) | 3.0 |
| VALIPAST 3810 (Orient) | 4.0 |
| SILWET L-7622 (Witco Corp., OSI Specialties Group) | 0.5 |
| | 100.5 |

The ink composition was prepared and jet printed on various substrates. The messages were tested for rub resistance and scratch resistance as set forth in Example 1.

The messages printed on glass aluminum, tin, PETG, polystyrene, and polycarbonate substrates had 'good' rub resistance and scratch resistance. The messages printed on an LDPE substrate also had 'good' rub resistance and 'good' scratch resistance. The messages printed on a PP substrate had 'good' rub resistance and 'fair' scratch resistance.

EXAMPLE 10

This Example illustrates that a jet ink composition that does not include a rosin resin would produce messages having decreased abrasion resistance. The jet ink composition of this Example is substantially the same as the ink composition illustrated in Example 4, except that the ink composition does not include a rosin resin. The following ingredients were used.

| Ingredients | wt % |
|---|---|
| Acetone, 99% (Ashland) | 50.0 |
| Ethanol (Duplicating Fluid #5, anhydrous) (Eastman Chemical) | 20.0 |
| SCHOLLE 5390 (Scholle) (35% of Hercules RS type/20 cps cellulose nitrate, in 15% of IPA and 50% of acetone) | 18.0 |
| Plasticizer 160 (Monsanto) | 1.5 |
| Primary amyl acetate (Union Carbide) | 3.0 |
| VALIPAST BLACK 3810 (Orient Chemical) | 4.0 |
| SILWET L-7622 (Witco Corp., OSI Specialties Group) | 0.5 |
| | 100.0 |

The ink composition was prepared and jet printed on various substrates. The messages were tested for rub resistance and scratch resistance as set forth in Example 1.

The messages printed on an LDPE substrate had 'good' rub resistance and 'fair' scratch resistance. The messages printed on a PP substrate had 'fair' rub resistance and 'poor' scratch resistance.

The rub resistance and scratch resistance of the embodiments illustrated in Examples 1–10 are set forth below:

TABLE 1

Rub and Scratch Resistance of Jet Printed Messages of Examples 1–10

| | LDPE | | PP | |
|---|---|---|---|---|
| | Rub | Scratch | Rub | Scratch |
| Example 1 | Good | Good | Good | Fair |
| Example 2 | Good | Good | Good | Fair |
| Example 3 | Good | Good | Good | Fair |
| Example 4 | Good | Good | Good | Fair |
| Example 5 | Good | Good | Good | Fair |
| Example 6 | Good | Good | Good | Fair |
| Example 7 | Good | Good | Good | Fair |
| Example 8 | Good | Good | Good | Fair |
| Example 9 | Good | Good | Good | Fair |
| Example 10 | Good | Fair | Fair | Poor |

The foregoing shows, among other things, that a jet ink composition containing a combination of a cellulose nitrate resin and a rosin resin have superior and unexpected properties.

All of the references cited herein, including patents and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A jet ink composition suitable for printing on plastic substrates messages having abrasion resistance, said composition comprising an organic solvent, a dye, a cellulose nitrate resin, and a rosin resin.

2. The jet ink composition of claim 1, wherein said composition has (1) a viscosity from about 1.6 to about 10.0 centipoises at 25° C.; (2) an electrical resistivity from about 50 to about 2000 ohm-cm; and (3) a sonic velocity from about 1100 to about 1700 meters/second.

3. The jet ink composition of claim 2, wherein said organic solvent is selected from the group consisting of alcohols, ketones, esters, and combinations thereof.

4. The jet ink composition of claim 3, wherein said organic solvent is selected from the group consisting of alcohols, ketones, and combinations thereof.

5. The jet ink composition of claim 4, wherein said rosin resin is a rosin ester resin.

6. The jet ink composition of claim 5, which further includes a plasticizer.

7. The jet ink composition of claim 6, wherein said cellulose nitrate resin is present in an amount of from about 5% by weight to about 10% by weight of the jet ink composition.

8. The jet ink composition of claim 6, wherein said rosin ester resin is present in an amount of from about 1% by weight to about 5% by weight of the jet ink composition.

9. The jet ink composition of claim 6, wherein said organic solvent is a mixture of acetone and ethanol.

10. The jet ink composition of claim 9, which further includes a blush-resistant agent.

11. The jet ink composition of claim 10, wherein said acetone is present in an amount of from about 30% by weight to about 70% by weight of the jet ink composition, said ethanol is present in an amount of from about 5% by weight to about 40% by weight of the jet ink composition, said dye is present in an amount of from about 2% by weight to about 6% by weight of the jet ink composition, said cellulose nitrate resin is present in an amount of from about 5% by weight to about 10% by weight of the jet ink composition, said rosin ester resin is present in an amount of from about 1% by weight to about 5% by weight of the jet ink composition, said plasticizer is present in an amount of from about 1% by weight to about 3% by weight of the jet ink composition, and said blush-resistant agent is present in an amount of from about 1% by weight to about 5% by weight of the jet ink composition.

12. The jet ink composition of claim 10, which further includes a wetting agent.

13. A method for printing abrasion resistant messages on a surface comprising projecting a stream of droplets of the jet ink composition of claim 10 to said surface, controlling the direction of the stream so that the droplets are caused to form the desired printed messages, and allowing the messages to dry.

14. The method of claim 13, wherein said surface is a plastic surface.

15. A method for printing abrasion resistant messages on a surface comprising projecting a stream of droplets of the jet ink composition of claim 6 to said surface, controlling the direction of the stream so that the droplets are caused to form the desired printed messages, and allowing the messages to dry.

16. The method of claim 15, wherein said surface is a plastic surface.

17. The method of claim 16, wherein said plastic is a polyolefin.

18. A method for printing abrasion resistant messages on a surface comprising projecting a stream of droplets of the jet ink composition of claim 1 to said surface, controlling the direction of the stream so that the droplets are caused to form the desired printed messages, and allowing the messages to dry.

19. The method of claim 18, wherein said surface is a plastic surface.

20. The method of claim 19, wherein said plastic is a polyolefin.

* * * * *